(12) United States Patent
Kirsch (10) Patent No.: US 7,090,066 B2
(45) Date of Patent: Aug. 15, 2006

(54) UNLOADING SYSTEM FOR PARTICULATE MATERIAL

(75) Inventor: Jason R. Kirsch, St. Brierx (CA)

(73) Assignee: Bourgault Industries Ltd., Saskatchewan (CA)

(*) Notice: Subject to any disclaimer, the term of this patent is extended or adjusted under 35 U.S.C. 154(b) by 88 days.

(21) Appl. No.: 10/619,258

(22) Filed: Jul. 11, 2003

(65) Prior Publication Data
US 2004/0136817 A1     Jul. 15, 2004

(30) Foreign Application Priority Data
Jul. 12, 2002   (CA)   .................................. 2393119

(51) Int. Cl.
B65G 41/00    (2006.01)
(52) U.S. Cl. .................... 198/302; 414/572; 280/414.5
(58) Field of Classification Search ........ 414/572–575, 414/482, 483; 198/302, 311; 280/414.5
See application file for complete search history.

(56) References Cited

U.S. PATENT DOCUMENTS

| | | | | |
|---|---|---|---|---|
| 396,197 A * | 1/1889 | Dodge | .................... | 198/550.4 |
| 809,373 A * | 1/1906 | Hof et al. | .................... | 198/311 |
| 947,592 A * | 1/1910 | Gilman | .................... | 198/535 |
| 988,684 A * | 4/1911 | Ackerman | .................... | 414/574 |
| 1,272,425 A * | 7/1918 | Guthrie | .................... | 414/574 |
| 1,752,612 A * | 4/1930 | Owens et al. | .................... | 198/735.3 |
| 1,770,650 A * | 7/1930 | Levin | .................... | 198/735.3 |
| 2,251,990 A * | 8/1941 | De Young | .................... | 414/572 |
| 2,682,947 A * | 7/1954 | Belt | .................... | 198/550.12 |
| 3,378,152 A * | 4/1968 | Warner | .................... | 414/574 |
| 3,528,570 A * | 9/1970 | Pase | .................... | 414/376 |
| 3,606,050 A * | 9/1971 | Silver | .................... | 414/574 |
| 3,618,744 A * | 11/1971 | Hulette | .................... | 198/508 |
| 3,802,584 A * | 4/1974 | Sackett et al. | .................... | 414/376 |
| 4,171,040 A * | 10/1979 | Nickol | .................... | 198/302 |
| 4,289,944 A * | 9/1981 | Reese | .................... | 219/655 |
| 4,345,681 A * | 8/1982 | Vinson | .................... | 198/550.12 |
| 4,430,849 A * | 2/1984 | Wilson et al. | .................... | 56/12.8 |
| 4,494,903 A * | 1/1985 | Badicel et al. | .................... | 414/376 |
| 4,516,902 A * | 5/1985 | Matson | .................... | 414/480 |
| 4,603,775 A * | 8/1986 | Plett | .................... | 198/589 |
| 4,813,839 A * | 3/1989 | Compton | .................... | 414/345 |
| 4,963,066 A * | 10/1990 | Boppart | .................... | 414/376 |
| 5,088,871 A * | 2/1992 | Mellish | .................... | 414/327 |
| 5,127,514 A * | 7/1992 | Guttinger et al. | .................... | 198/803.11 |
| 5,137,297 A * | 8/1992 | Walker | .................... | 280/414.5 |
| 5,176,394 A * | 1/1993 | Veazey | .................... | 280/414.2 |
| 5,292,238 A * | 3/1994 | Michalak | .................... | 425/9 |
| 5,297,914 A * | 3/1994 | Ash | .................... | 414/574 |
| 5,297,920 A * | 3/1994 | Pomerville et al. | .................... | 414/376 |
| 5,387,073 A * | 2/1995 | Etherington et al. | .................... | 414/353 |
| 5,775,868 A * | 7/1998 | Mann | .................... | 414/475 |
| 5,964,566 A * | 10/1999 | Stewart et al. | .................... | 414/572 |
| 5,967,733 A * | 10/1999 | Cash | .................... | 414/483 |
| 6,010,280 A * | 1/2000 | Svensson | .................... | 406/56 |

(Continued)

FOREIGN PATENT DOCUMENTS

CA        2360474        4/2003

*Primary Examiner*—Gene O. Crawford
*Assistant Examiner*—Rashmi Sharma
(74) *Attorney, Agent, or Firm*—Frost Brown Todd LLC (57) ABSTRACT

This invention concerns a new grain unloading system using an integrated ramp, horizontal transfer conveyor and elevating system. The unit is towed, positioned and powered by an agricultural tractor.

15 Claims, 9 Drawing Sheets

U.S. PATENT DOCUMENTS

| | | | |
|---|---|---|---|
| 6,027,297 A * | 2/2000 | Dungan | 414/362 |
| 6,068,103 A * | 5/2000 | Werner | 198/311 |
| 6,217,053 B1 * | 4/2001 | Forsythe et al. | 280/414.3 |
| 6,471,031 B1 * | 10/2002 | Duncalf | 198/311 |
| 6,474,672 B1 * | 11/2002 | Briscese | 280/414.5 |
| 6,485,246 B1 * | 11/2002 | Harkcom et al. | 414/537 |
| 6,511,279 B1 * | 1/2003 | Harkcom et al. | 414/537 |
| 6,527,494 B1 * | 3/2003 | Hurlburt | 414/482 |
| 6,575,487 B1 * | 6/2003 | Krause | 280/414.1 |
| 6,592,139 B1 * | 7/2003 | Shanahan | 280/414.5 |
| 6,616,166 B1 * | 9/2003 | Marchese | 280/414.1 |
| 6,616,167 B1 * | 9/2003 | Guiet | 280/414.5 |
| 6,648,578 B1 * | 11/2003 | Rouse | 414/482 |

* cited by examiner

UNLOADING SYSTEM FOR PARTICULATE MATERIAL

PRIORITY CLAIM

Priority is claimed based on Canadian Patent Application No. 2,393,119, filed Jul. 12, 2002.

FIELD OF THE INVENTION

This invention is in the field of particulate material unloading systems, and particularly addresses improvements in efficiency and ease of use of systems for unloading granular agricultural materials from transport vehicles into storage bins, or other generally larger transport vehicles.

BACKGROUND

In farming, "grain augers" are commonly used to unload granular agricultural materials from trucks into bins.

Over the years, the scale of farms and of the equipment used in farming has progressively increased. Formerly, loading/unloading augers were relatively small and light, and it was possible for a physically fit operator to manually position them for use (operation). It was also possible for a reasonably skilled operator to back up a simple dump truck and position its discharge chute over the inlet of a material transfer auger. Also in the past, a helper was often available to assist with the physical movement of equipment and to provide guidance in positioning the truck.

As large grain auger/conveyors have come into use, it is no longer possible or easy to practically position them by hand, and some are sufficiently large to require a tractor to tow, position and power them.

Much less manoeuvrable belly-dump semi-trailers and highway tractor trucks are now often utilised to haul agricultural materials rather than end-dump grain trucks. It is much more difficult or at times impossible to manoeuvre a semi-trailer or highway tractor trucks into position relative to a conventional unloading system.

Work on a grain farm is seasonal in nature, and opportunities for full time employment have continuously decreased over time. Consequently, there has been less and less labour available on the typical farm. Whereas in the past another person may have been available to assist with positioning equipment, that is no longer the case in many situations. To compound the problem, the age of the farming population has increased significantly and farmer operators are less able to perform physically demanding tasks.

With fewer available operators, the time of the farmer/operator is increasingly valuable. Time-consuming, low value-adding physical operations must be minimized in the interest of improved economics of scale and the avoidance of personal injury.

Safety is also an issue when an operator is working alone, as farmers are often required to do.

With current economic pressures, farming operations increasingly demand equipment that is safe, simple and easy to use and maintain, cost effective, and which offers the highest possible overall efficiency of use.

To address current needs, industry has responded with innovations in unloading system design. Various adaptations of existing equipment have been devised.

Swing-Away Conveyor Systems

The current standard in the industry is the swing-away type screw auger that is connected to an agricultural tractor. Such a system is disclosed in U.S. Pat. Nos. 4,963,066 to Boppart and 4,603,775 to Plett. The system has a lower, swingable transfer auger portion that is swung under a grain trailers unloading chutes. The lower transfer auger then unloads into the main transfer auger. This is a somewhat cumbersome system that requires the swingable auger to be swung under the grain trailer and removed each time the trailer is unloaded. If the trailer is a B-train type or a Super-B-train type™, meaning two trailers with a fifth wheel pivot and a set of two or three axles respectively located in between the unloading chutes or group of unloading chutes of each trailer, the swingable auger has to be swung under and from under each of the trailers.

As illustrated in Boppart, the tractor is connected to the swing-away auger system at the outboard end of the main transfer auger. The swing-away portion is then typically approximately 90 degrees to the main transfer auger to allow the grain trailer to approach the unloading system close enough to allow for unloading. This arrangement is often not convenient or even suitable for some yards where the ability to manoeuvre the highway tractor unit and the grain semi-trailer is restricted by the grain bins themselves, buildings, overhead power lines or trees, et cetera.

U.S. Pat. No. 6,068,103 to Werner discloses an alternative swing-away auger extension.

Westfield's MK Series™ grain augers are present-day swing-away conveyor systems.

Generally with swing-away type conveyor systems, a sometimes awkward, less than ideal positioning of the main conveyor and its power unit is required. This type of system requires cumbersome manual handling of the swing-away auger extension before and after unloading, and for each trailer and often for each unloading chute in a semi-trailer train. Typically the user has to jockey the auger conveyor, the semi trailer and tractor unit, truck, or both.

Ramp/Ramp Over Systems

In an attempt to improve upon the swing-away auger system, various types of ramps and combinations of ramp and self-contained intermediate transfer augers have been devised which make it possible to simply drive a truck or semi-trailer over the inlet of the transfer auger system; facilitating use and eliminating the need for repositioning of the unloading equipment for each truckload. One such system is manufactured by Westfield™.

In the Westfield™ device, the ramp system is simply placed over the hopper of a conventional swing-away auger system. This approach still has serious drawbacks in that such a ramp is typically too large to be handled manually Y and requires another tractor to carry and position it. Otherwise, the tractor that is being used to power the auger needs to be disconnected from the main elevating device, and re-connected before and after (respectively) each repositioning of the ramp. The process needs to be repeated each time the conveyor system is moved to a different bin. The positioning of auger and its power unit remain somewhat awkward and less than ideal. Initial manual handling/positioning of the swing away auger extension and separate handling of the ramp is required.

Separate Transfer Conveyor/Ramp System

The separate horizontal transfer auger, alone or in combination with a drive-over ramp is another approach that has been employed to improve upon the ease and efficiency of unloading agricultural materials, as illustrated in the Portable Pit™ device.

The device includes a frame with a pair of support wheels and a hitch. Connected to the frame is a pit with manual, spring-assisted, folding ramps. There are twin screw lateral transfer augers located at the bottom of the pit. In addition, there is a single screw intermediate auger. Thus the whole device is built into a trailer-type unit.

The ConveyAll™ belt-type conveyor similarly has a ramp. However, this device uses an endless belt rather than screw lateral transfer augers and has a ramp detachable from the transfer conveyor.

With both of these systems, there are either one or two components (transfer conveyor and ramp) in addition to the main elevating device that must be handled/positioned each time the loading system is relocated. The components are too large to be handled manually so another tractor is required to carry and position the components. Otherwise, the tractor that is being used to power the main elevating device needs to be disconnected, and re-connected before and after (respectively) the positioning of the intermediate transfer unit and ramp. That process needs to be repeated each time the auger is moved to a different bin.

Other devices use an expensive, separately powered intermediate transfer system.

U.S. Pat. No. 5,964,566 to Stewart et al discloses a portable, drive-over grain hopper that comprises a substantially horizontal, paddle-type transfer conveyor. A belly-dump truck may be easily positioned over the hopper of this invention for unloading bulk granular materials. This transfer conveyor also comprises a removable tow hitch and transport wheels to allow it to be easily relocated. One disadvantage of this invention is that the horizontal transfer conveyor must be towed and positioned separately from the elevating conveyor that it is intended to discharge into. A further disadvantage is the need to manually elevate the hitch for attachment to the towing vehicle, and where necessary, to install and remove the transport wheels. Yet another disadvantage is the need to manually fold the ramps for transport.

This equipment as developed to date, is typically cumbersome, complex and costly and leaves unaddressed, opportunities to further increase cost effectiveness. Either a separate tractor is required to position the equipment or it is necessary to disconnect the tractor that is powering the unloading auger for the purpose of positioning the ramp and auxiliary auger system. Each piece of the unloading equipment system must still be separately positioned when moving from one bin to another, consuming valuable time. Complexity leads to more required maintenance, a higher probability of breakdown and increased costs. High cost compounds the economic pressures on farming operations.

Integrated Systems

An integrated belt conveyor with ramps has a flexible-walled hopper and drive-over belt conveyor. One such device is named INNO-Veyor™.

One benefit of such a device is that it allows normal positioning of the elevating auger relative to the bin. The lateral transfer section, complete with ramps is integrated with the elevating section, eliminating the need for separate handling and positioning of ramps and transfer section. In addition, the lateral transfer section and elevating section share a common towing/power unit. Finally, the unit incorporates a hitch for towing and wheels for trailering the entire lateral transfer and elevating unit.

One of the problems with this system is that it is limited to a belt-type conveyor, to be able to drive upon it without damaging it. The system also requires a heavy transfer structure also to enable driving on it. Another problem is the relatively narrow opening to receive material because the width of the belt is limited to that which can be used in the elevating section. Also, the structure/mechanism needed to support and operate a drive-over belt may be relatively tall which limits the clearance between the belly dump chute of a grain trailer and the flexible hopper above the device and also the size of the opening into which material can be dumped.

The present inventor believes that a hydraulic cylinder is used to position and hold the joint rigid between the lateral and elevating sections of the device. The structures of both sections must therefore be sufficiently strong to bear the bending that tends to occur in this area. It seems to the present inventor that if an error is made in positioning the transfer section for use, or if part of the lateral transfer section sinks into soft soil under the weight of the truck/trailer, an undue stress would be imposed on the structure. It is not likely to be economical to build the unit heavy enough to withstand such loading.

U.S. Pat. No. 6,471,031, which issued to Stanley R. Duncalf discloses a material handling conveyor adapted for ease of hitching to a towing vehicle. A substantially horizontal transfer conveyor portion is pivotally connected to an elevating conveyor portion and the horizontal transfer conveyor portion comprises a hitch. One or more hydraulic cylinders are provided for positioning the horizontal transfer conveyor portion and hitch for ease of connection to the towing vehicle. This patent does not address the difficulties in an agricultural situation where bulk particulate materials must be unloaded onto the conveyor from large, difficult to manoeuvre, multi-trailer, highway tractor truck units.

It is an object of this invention to improve upon existing particulate material unloading systems that are presently made up of a number of separate components which can include a main elevating conveyor; a separate auxiliary horizontal transfer conveyor; an integrated swing away horizontal transfer conveyor; and a separate ramp system. It is a further object to dispense with separate handling and positioning of separate components and eliminate disconnection and re-connection of the towing vehicle.

Specifically, it is an object of this invention to provide, in a particulate material unloading system: an integrated main conveyor and transfer conveyor complete with an integrated drive-over ramp/platform such that only one piece of equipment is used to transport, position and power the system. Thus it is not necessary to utilise a separate transfer auger and ramp. It is a further object to make the positions of conveyor and truck tractor trailer(s) unit more normal and convenient, and finally provide all functions powered by and conveniently and remotely operated from the towing vehicle, including operation of ramps, transport wheels, hitch and conveyors without having to disconnect the towing vehicle or the powering systems. It is also an object of this invention to provide power actuated ramps for ease of use and easy positioning of trucks for tractor and trailer(s) units unloading; said ramps being foldable for narrow transport width; said system having no requirement for manual effort in the operation, apart from operating powered equipment through remote controls; said system providing power actuated transport wheels and hitch for ease of changing from operating to transport position; said system further providing articulation between auxiliary and main conveyor as well as support by transport wheels such that no portion of the weight of a truck tractor and trailer(s) unit on the ramp/platform is transferred to the main conveyor; towing for transport is accommodated without having to provide a rigid joint between auxiliary and main conveyors; and relative movement in transport is accommodated and does not impose strain on either transfer or main conveyor structure; said system further providing the option of using different types of conveyors that may be preferred, including auger/ screw, belt, paddle, and bucket; said invention providing a conveyor drive train connection at the hitch so that conveyors are driven by the tractor and the drive need not be disconnected for transporting. Another object is to provide a truck position indicator means to facilitate aligning truck trailer unloading chutes and hoppers with the material receiving area of the unloading system.

SUMMARY OF THE INVENTION

Therefore, this invention seeks to provide an integrated particulate material transfer system adapted to be towed and activated by a motive power source, namely an agricultural tractor; said device including:
an elongated horizontally disposed platform;
said platform being supported at one end by at least one retractable transport wheel, and at an opposite end, by a movable hitch; said hitch adapted to be pivotally connected to said motive power source;
pivotally attached ramps;
said platform containing transfer means for conveying particulate material from the platform to a main transfer conveyor; wherein said motive power source and said integrated material transfer system, when used together, are always connected for both operation and transport.

This invention also seeks to provide an integrated a mobile unloading and conveying device for particulate material adapted to be towed and activated by a power source, said device including:
an elongated horizontally disposed platform;
said platform being supported at one end by a pair of retractable transport wheels, and at an opposite end by a hingedly connected hitch; said hitch adapted to be mounted to said power source;
a rearward and a forward pair of foldable ramps; said ramps being transverse to said platform, parallel to one another, and extending outwards from both sides of said platform;
each of said forward and rearward pair of foldable ramps including a centre section which is integrally connected with and forms a portion of said platform;
at least one first horizontally disposed transfer conveyor located within said platform, and adapted in operation to move particulate material rearwardly within said platform;
said at least one transfer conveyor being connected by articulated joints to at least one obliquely disposed second transfer conveyor;
said at least one second transfer conveyor being connected at a remote end to a main elevating conveyor by a pivotal joint;
said second transfer conveyor in operation adapted to discharge particulate material into said main conveyor; said platform further including on its upper side a particulate material receiving aperture adapted to receive contents of a vehicle transporting particulate material;
said aperture being located between said forward pair and said rearward pair of ramps;
wherein in operation, when said hitch is raised at its forward end and said transport wheels are retracted, said platform is in an operating unloading position adapted to receive and convey particulate material; and when said transport wheels are extended and said hitch lowered, said device can be transported to another location such that a remote end of said main conveyor can be positioned to discharge its contents into a desired storage facility.

The main conveyor is conventional except as its lower end where it attaches to the unloading system platform. The main conveyor can be one of a number of conventional types of conveyor. The main conveyor is supported at approximately its midpoint by a structure that extends downward to a pair of main transport wheels. As is typical in the industry, this supporting structure incorporates a means for raising and lowering the main conveyor tube.

The lower end of the main conveyor and the adjoining trailing end of the platform are supported by a pair of retractable platform transport wheels. These wheels are retracted (hydraulically) to lower the trailing end of the platform onto the ground for operation and extended to raise it for transport of the system.

A linkage is provided from the transport wheels to a pivoting tow hitch such that when the transport wheels are retracted the towing hitch is also raised, lowering the leading end of the platform to the ground as well.

To maintain stability in transport, all wheels of the transport system must remain on the ground as the unit is transported. This is accomplished by providing articulation at the lower end of the main conveyor tube. The main conveyor tube is sectioned near its lower end. A pair of mating flanges, appropriately slotted and constrained in sliding rotation pivotally connect a short, lower stub section of the main conveyor housing to the rest of the conveyor housing. This provides for rotation of the lower stub tube relative to the main conveyor tube around their coincident longitudinal axes.

The sides of the lower stub tube are apertured to receive material from a pair of smaller conveyors that are extensions of and carry material from the platform conveyors. A pivotable joint similar in design to that between the main and stub tube connects these small conveyor housings to the main conveyor stub tube. This pivoting arrangement allows for a change in the angle between the platform and the main auger, which is necessary both when the system is transported over uneven terrain, and when the platform is lowered or raised in preparation for operation or transport. When these small conveyors are screw augers, they are driven through flexible joints at the output ends of the platform screw augers.

A set of ramps have centre sections which are integrally attached to the platform to permit a truck to drive over the platform. The ramps are foldable to provide for narrow transport width, and hydraulically powered for ease of use. The platform is provided with an apertured upper surface for receiving particulate material from a hopper or tailgate outlet of a truck. The platform houses substantially horizontal transfer conveyors for conveying material from the material receiving area of the platform to the main conveyor. The platform conveyors are powered by the towing tractor. The main conveyor is also powered by the towing tractor. The drive for the main conveyor passes through the platform.

A hitch is mounted on the end of the platform opposite the main conveyor. The hitch is hinged to the platform and linked to the platform transport wheel mechanism. As the platform transport wheels are actuated to raise or lower the conveyor end of the platform, the hitch moves to raise or lower the hitch end of the platform. The hitch thus supports the platform for transport, and is allowed to pivot on its hinge to lower the platform to the ground for operation of the unloading system, without having to uncouple the towing vehicle from the unloading system. A manually operated hitch jack is provided for supporting the hitch end of the system when a towing vehicle is not connected.

A system may also be provided for assisting a truck driver in properly positioning a truck/trailer outlet over the unloading system. This feature may consist of a retractable cord or tape that can be marked to correspond to the driver's position when each truck/trailer outlet is properly positioned. Once the system is calibrated, a driver need only stop the truck when the driver's position corresponds to a mark on the cord/tape and the respective outlet will be properly positioned over the unloading system.

In operation, the operator connects the towing vehicle (tractor) to the hitch, and raises the hitch jack's base off the ground and stores the jack. He then connects hydraulic power from the towing vehicle to the platform and connects the conveyor drive which is powered by the power take off of the tractor. The operator tows the unit to a desired position with the conveyor outlet aligned with a material storage facility inlet. Thereafter, the operator actuates the hydraulic circuit to lower the entire platform to rest on the ground (i.e. retract platform wheels and raise hitch) and unfold ramps and lay them out on the ground. The system is now ready to unload a vehicle. A particulate material transporting vehicle is driven over the ramps and positioned with a hopper outlet over the platform inlet. Thereafter, the conveyor drive to the towing/powering vehicle is engaged and the particulate material transporting vehicle hopper is opened to discharge the material into the unloading system inlet on the platform. When it is desired to move the unloading system to a different material storage facility, the hydraulics are reversed to prepare the unloading system for transport.

In summary, this invention also seeks to provide a particulate material unloading system with total integration of ramp/platform and conveyors, including powered, folding ramps for convenience and ease of use. It has a powered, co-actuated platform suspension for transport (platform wheels and hitch). Any type of conveyor can be used. The unit is towed/positioned and powered by the same vehicle (tractor) without having to disconnect the towing vehicle. All towing, positioning and operating functions are conveniently and remotely operated from the tractor cab. Finally, the transfer and main elevating conveyors are hinged where they join to provide necessary flexibility in transport and to allow the platform to rest on the ground for operation at any necessary angle relative to the main conveyor.

BRIEF DESCRIPTION OF THE DRAWINGS

The invention will be more fully described in conjunction with the following drawings wherein.

DETAILED DESCRIPTION OF THE INVENTION

Figure 1:
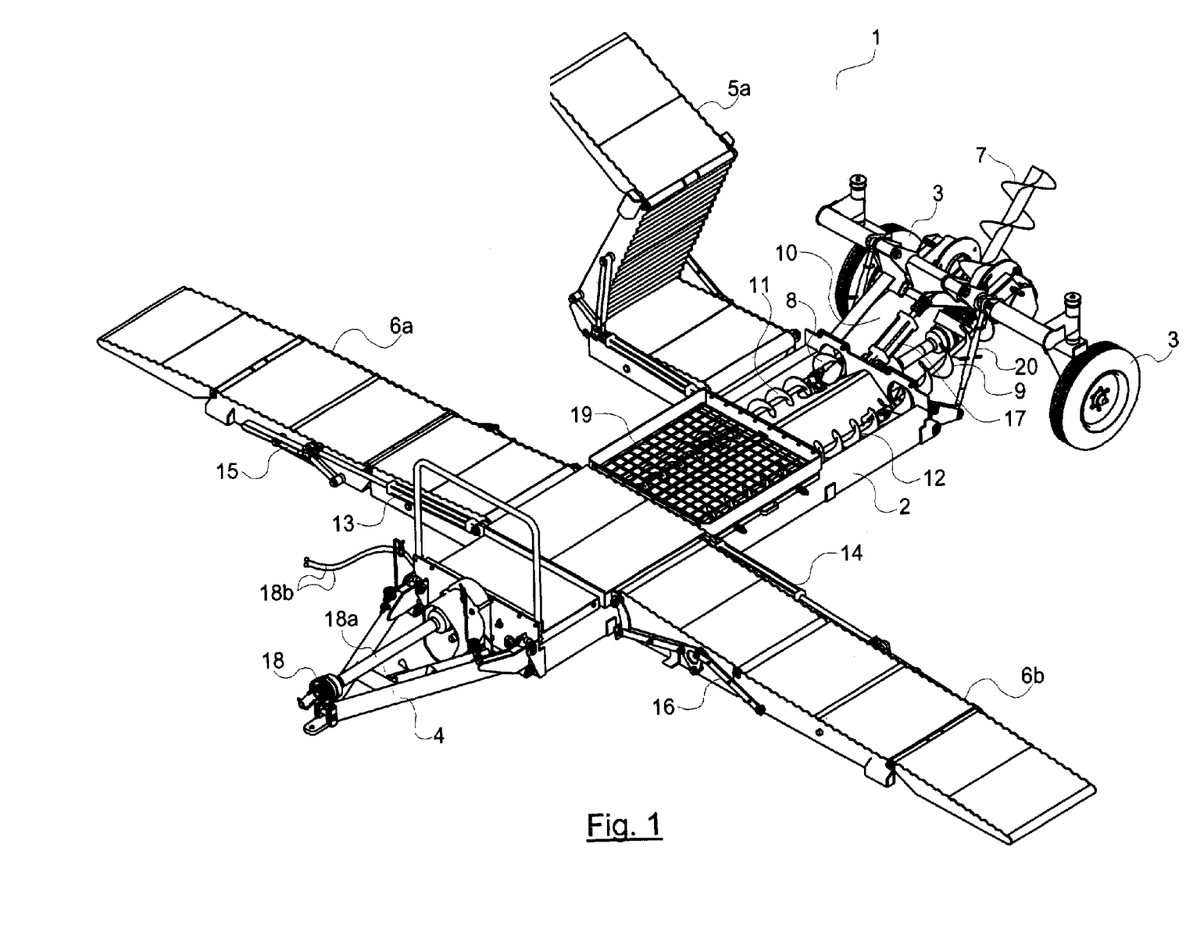
FIG. 1 is a schematic perspective view of the unloading device of the present invention. Some parts, as well as the left rear ramp, have been removed.

FIG. 1 gives an overall perspective view with some portions cut away or removed of the present invention shown generally as 1. The unloading device for particulate material, and more specifically for unloading grain from trucks and moving it into bins, has a generally longitudinal platform 2 which is supported at the rear end by retractable transport wheels 3 and at the front end by a hingedly connected hitch 4. The invention has a pair of right and left ramps at the rear and at the front. The centre portions of each of the front and rear ramps are integrally connected and form a portion of said platform.

In FIG. 1, the rear right ramp which is foldable is marked as 5a, while 5b has been removed for clarity of illustration. The front pair of ramps are marked as 6a and 6b. The ramps are parallel to one and other and spaced apart to allow a large grain truck, in fact, even an 18-wheeler, to drive up and then down the opposite side while unloading of material through cargo discharge apertures located on the bottom of the truck. The truck is generally positioned such that a discharge orifice would be centered over the central collection bin or opening marked as 19.

Grain is moved upwards through a main auger-type conveyor marked as 7. The grain is deposited into stationary grain storage bins, through the tops of the bins (not shown). The main horizontally disposed transfer conveyors are located within the platform and move material from the discharge opening area 19. These conveyors are marked on the right-hand side as 11 and on the left hand side as 12. These transport conveyors 11 and 12, in operation, move grain rearwardly to articulated smaller rear transfer conveyors 8 and 9. The transfer conveyors 8 and 9 discharge the grain at their upper ends into the main conveyor 7.

The ramps 5a, 6a, 6b and 5b (not shown), are foldable to allow narrow transport width, i.e. to move the vehicle down highways, roads or through crowded areas. The front right ramp 6a is actuated to a folding position by hydraulic cylinder 13 and the left-hand side front ramp 6b is actuated to the folding position and working position by hydraulic cylinder 14. Linkages 15 and 16 are attached to right-hand front ramp 6a and left-hand front ramp 6b. Similar linkages and hydraulics are found in the rear right and left ramps but are not marked.

In order to move the device from a transport position where it can be pulled by a power source, hydraulic cylinder 17 tilts the rear axle and the transport wheels from an extended position to a retracted or unloading position. Clearly, platform 2 must be secured firmly on the ground in order to avoid breakage when large trucks move over the platform via the ramps 5a, 6a et cetera. The movement of the ramps, transport wheels position and hitches are all accomplished by means of hydraulics which attach to the power source which is generally an agricultural tractor. The power of the conveyors is provided by the power takeoff (PTO) of the agricultural tractor. Numeral 18 indicates the shield on the first universal joint on the PTO shaft 18a. Hydraulic connection hoses are marked 18b.

The present invention can be actuated totally by a single operator in the power source and there is no need for manual lifting or moving of parts. The operator can remain at the power source and simply move the device to the correct position and fill one grain bin after another. The only other operator necessary is one to drive the truck in position over the ramp and the discharge area 19.

Moving the transport wheels from the extended to retracted position coincides with raising the hitch 4 and vice versa by means of a linkage to be described later. Turnbuckles 20, located on each side of the rear of the vehicle platform, adjust the linkage between the two.

Figure 2:
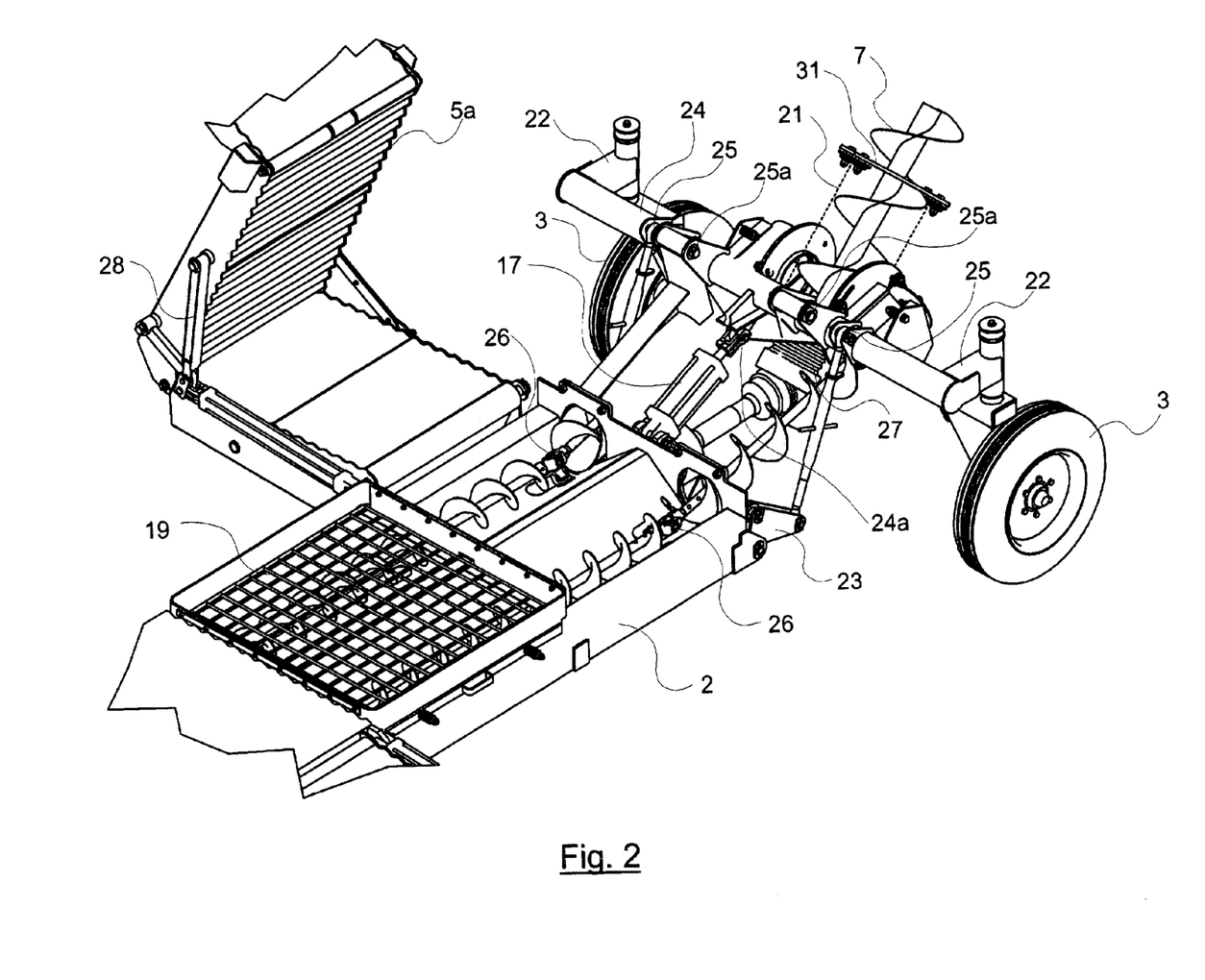
FIG. 2 is an enlarged view of the rear portion of the device shown in FIG. 1.

FIG. 2 is an enlarged view of the rear of the vehicle with a number of other portions labelled. For example, conveyor 7 is enclosed within conveyor tube 21 (shown in phantom). Transport wheels 3 are supported by wheel holders 22 which are attached to the main axle frame tube 24 that is rotated by hydraulics cylinder 17. Pivotal joints marked 25*a* permit the hydraulics to move the transport wheels 3 from a retracted to an extended position to be shown in later drawings. Turnbuckles 20 are attached to the platform pivotally on bell links 23. Transfer conveyors 11 and 12 are connected to smaller rearward articulated conveyors 8 and 9 by means of u-joints 26. The main elevating conveyor 7 is attached to a main drive shaft by means of a lower articulated stub section 27, which is basically the main drive CV joint. This joint allows the axle frame member 24 to pivot rearwardly and forwardly and not to affect the main conveyor 7. In FIG. 2, one notes the linkage to foldable right rear ramp 5*a* is more clearly shown as 28.

Figure 3:
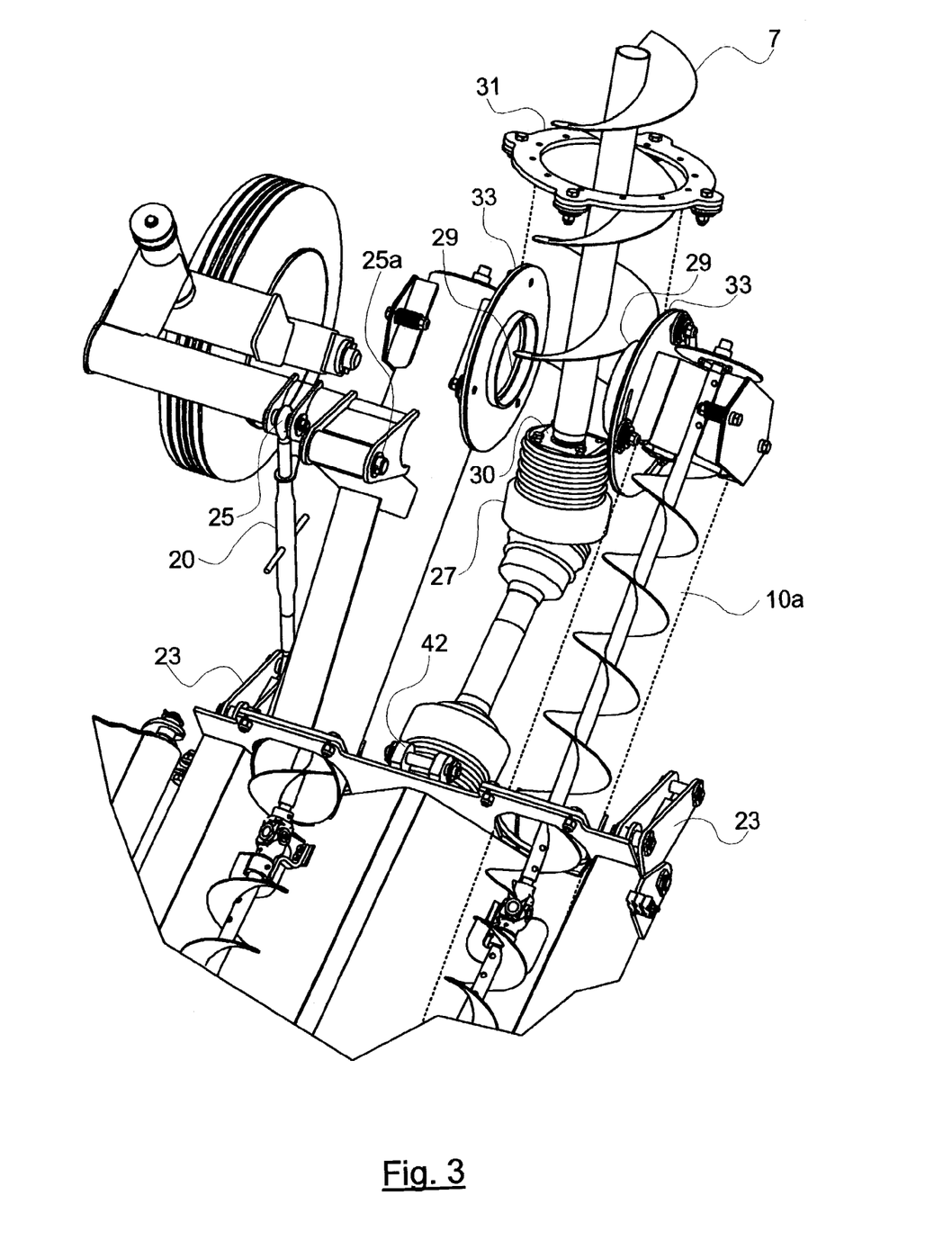
FIG. 3 is a further enlarged view of the rear portion of FIG. 2.

Turning to FIG. 3, one can easily view how the particulate material is moved upwardly through the rear smaller articulated conveyors and is discharged sideways into the main conveyor 7 by means of orifices 29. The main conveyor has a face plate 30, which is attached to the stub section of the conveyor 27. The main conveyor pivot plate is shown as 31 which allows for the rotational movement of the stub section conveyor casing, relative to the main conveyor casing around their longitudinal axes. The smaller casings 10 and 10*a*, are pivotally connected to the main conveyor stub tube 21 by means of articulating brackets 33. Casings 10 and 10*a* are also structured members rigidly attached to the platform. They also support the lower end of main conveyor 7. They also support the main axle frame tube 24. Extension and retraction of the transport wheels 3 is accomplished by rotating the main axle tube frame 24 around pivot points 25*a*.

Figure 4:
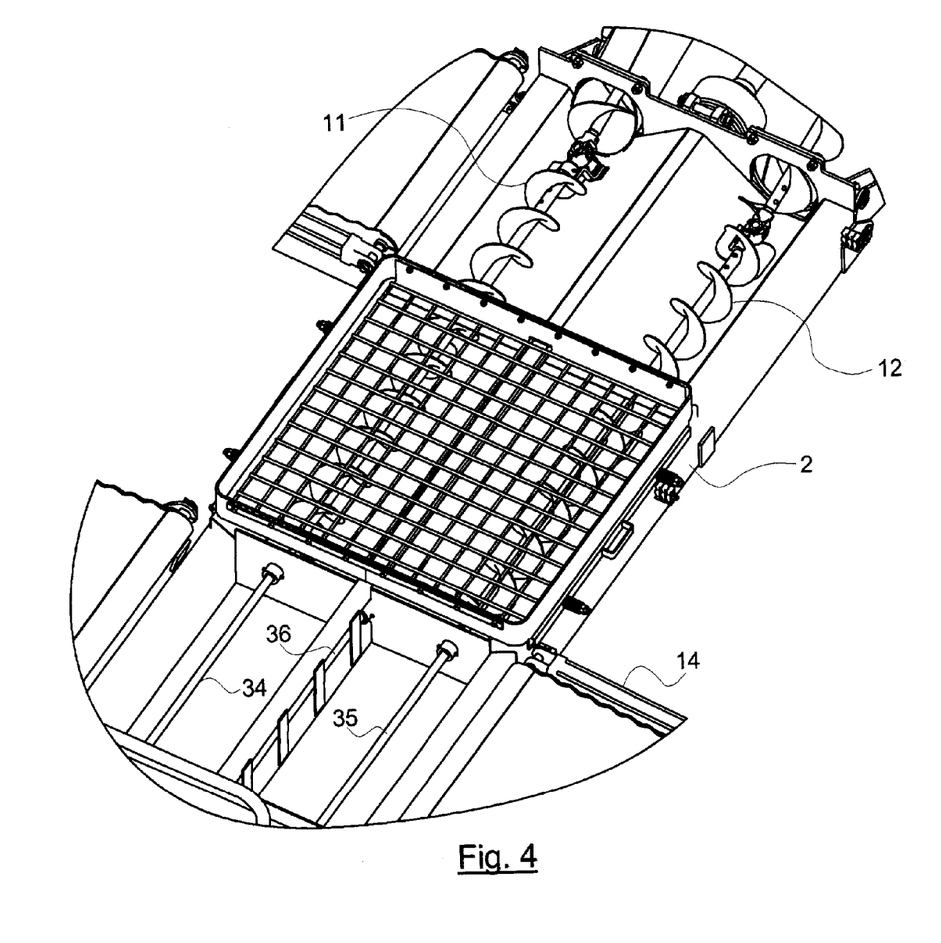
FIG. 4 is a cut away portion of the central section of the unloading device from a perspective view with some components removed.

FIG. 4 is a cutaway view looking downwardly at the platform 2. There are three shafts for the augers: main auger shaft 36; right-hand transfer auger shaft 34; and left-hand transfer auger shaft 35. These are all moved by means of connections to power takeoff shaft 18*a* which is powered by the towing and power source, namely the agricultural tractor.

Figure 5:
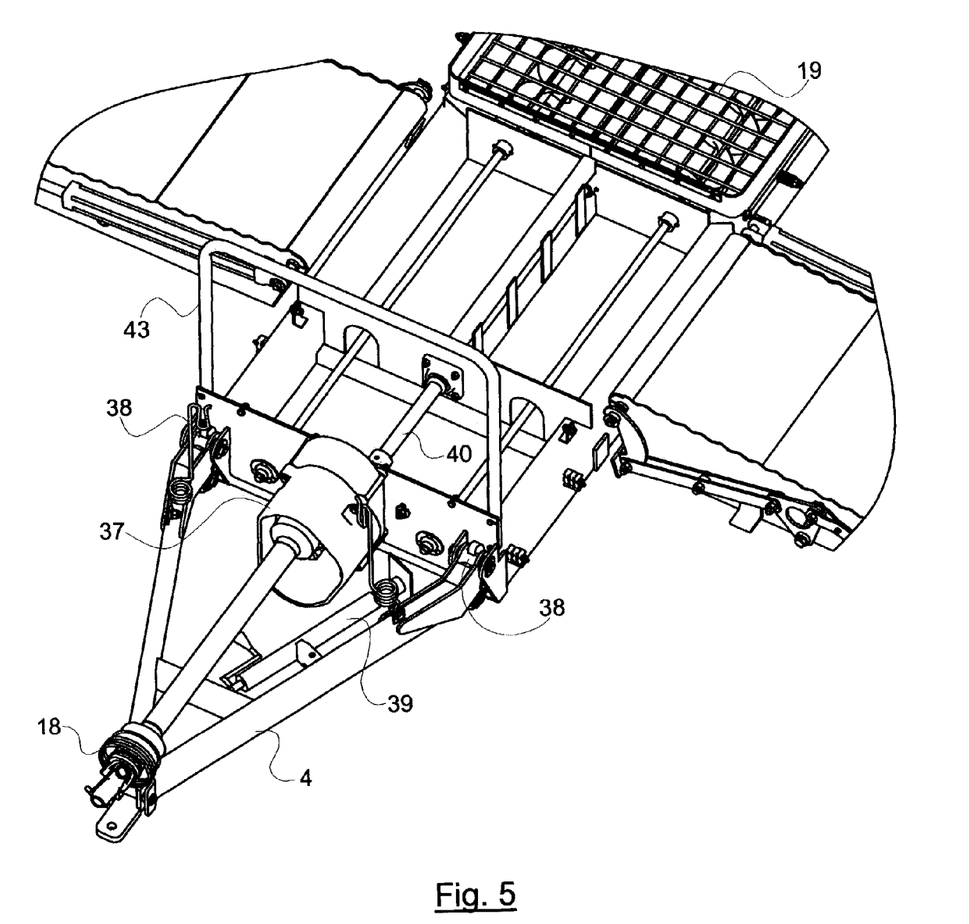
FIG. 5 is an enlarged view of the front portion of the device with some components removed.

These connections are not shown in detail as these are well known in the art. In FIG. 5, the hitch is hingable by means of a pivot hinge 38. Thus, to be discussed later, the hitch can be raised to allow the front portion of the platform to rest on the ground, and then lowered for a transport position. A manual hitch-jack can be used to move the front hitch when it is not attached to the power source. This manual hitch-jack is shown as 39. Also shown in FIG. 5 is a safety bar 43 which prohibits an operator from falling into the PTO shaft area.

Figure 6:
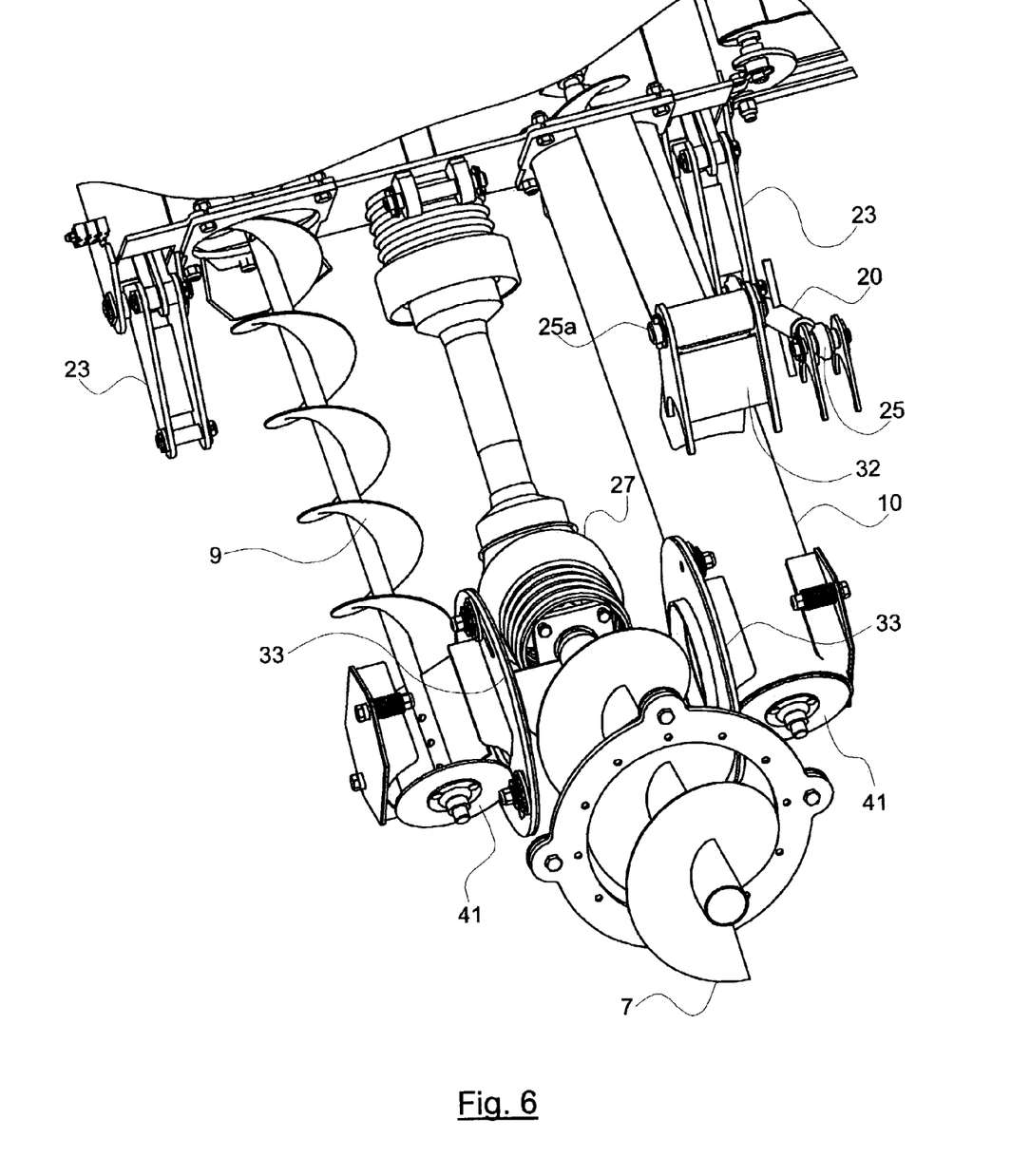
FIG. 6 is a view of the rear portion of the device taken from above and to the rear of the device.

FIG. 6 is another view of the rear end of the device looking from above and from the rear. One notes that the conveyors 8 and 9 are equipped with upper end plates 41.

Figure 7:
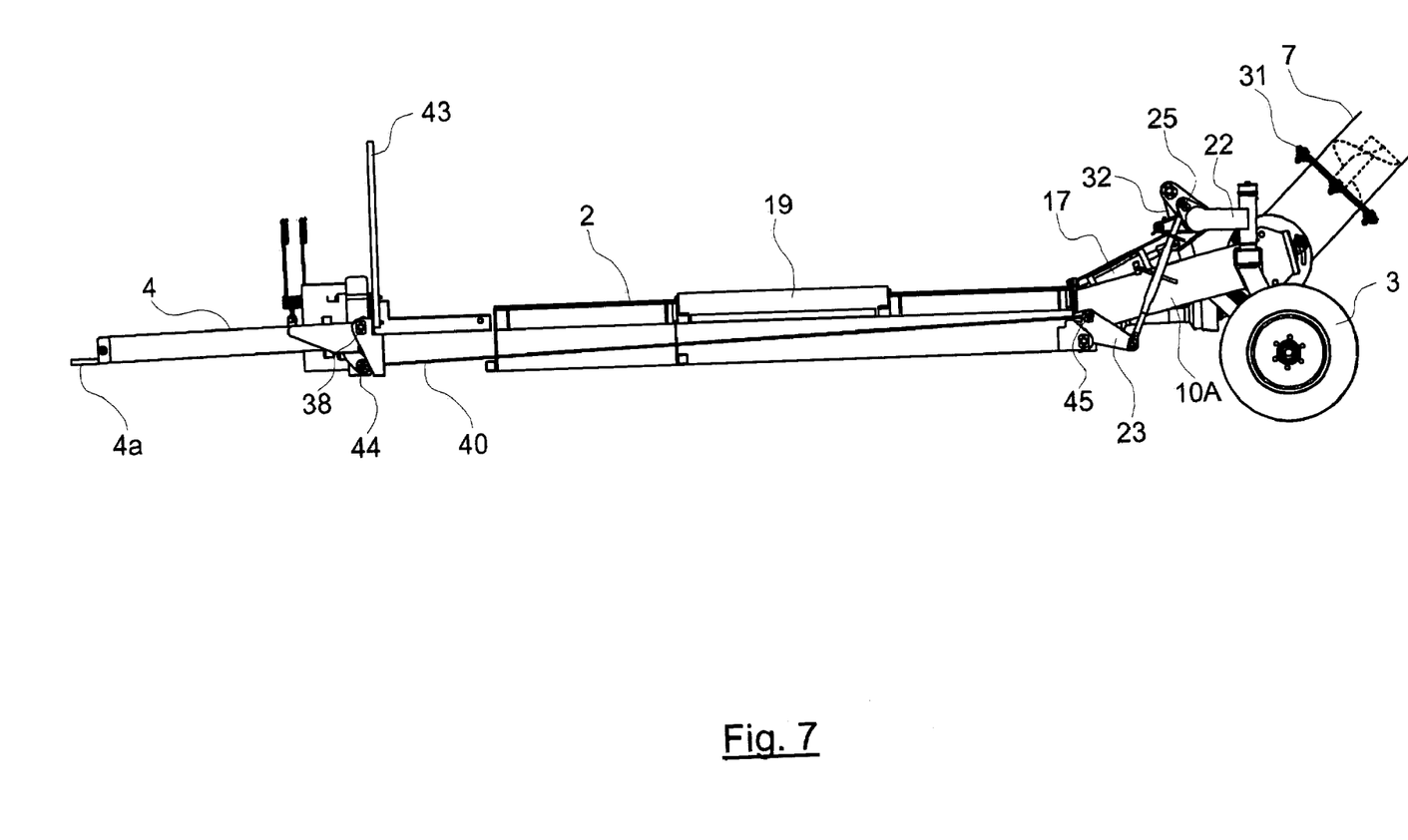
FIG. 7 is a side view of the device, showing it in a transport position.
Figure 8:
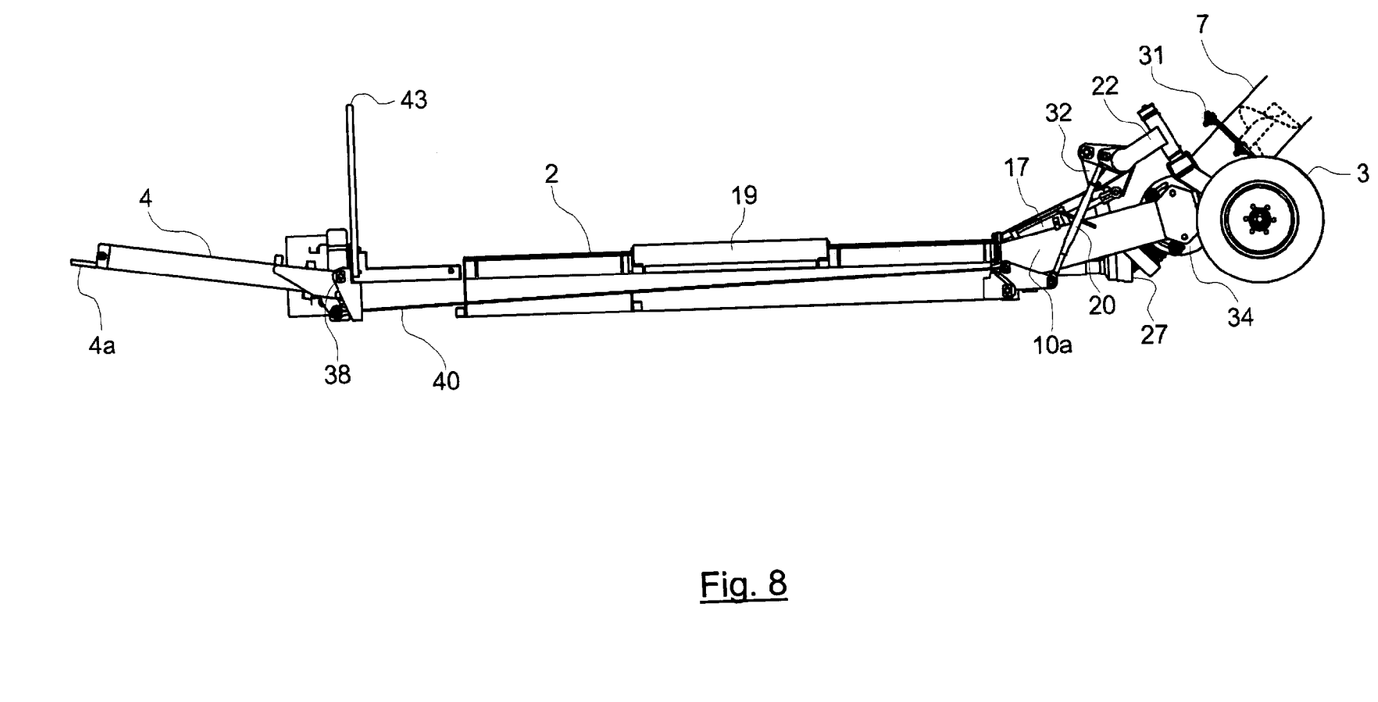
FIG. 8 is a side view of the device in the unloading or working position.

FIGS. 7 and 8 show the transport position of the device and the working or unloading position of the device respectively. In FIG. 7, the device is in the transport position. That is to say that hitch 4 extends straight out from platform 2. Hitch 4 is attached to an agricultural tractor by tongue 4*a*. In FIG. 7, the rear portion of the device is shown off the ground by means of hydraulics 17 which moves the wheels 3 downwardly and moving the rear of the platform upwardly. A link 40 connects the hitch 4 mechanism to the transport mechanism such that when the transport wheels are raised or lowered, similarly the hitch is moved upwardly or downwardly about hinge pivots 38. Link 40 is pivotally attached to the hitch at point 44 and at the rear of the device at point 45 located on bell crank 23. Turnbuckle attachment points 25 provide just the required amount of movement to properly drive bell cranks (links) 23 via turnbuckles 20 to properly move the hitch via link 40.

In order to allow the device to move to the working or unloading position, the main axle frame tube 24 is rotated by extension of hydraulic cylinders 17 which, at the same time, permits platform 2 to be placed firmly on the ground. At the same time, hitch 4 is raised which allows the front portion of the platform 2 to be firmly on the ground. The main conveyor 7 is always slightly supported above the ground, even in the unloading position. This prevents any damage to the articulated rear conveyors and the main conveyor 7.

Figure 9:
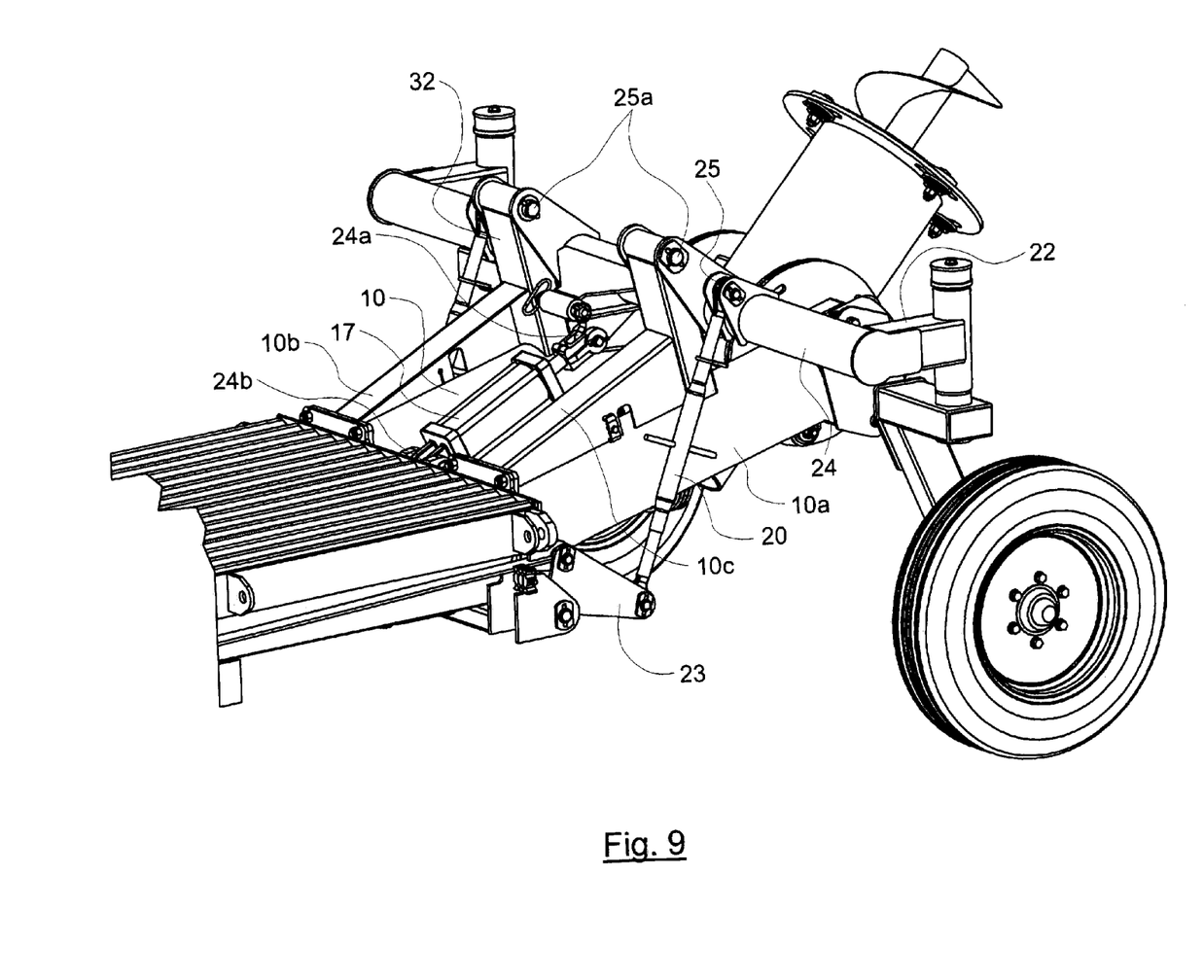
FIG. 9 is a detailed perspective view of the device showing the actuating mechanism for the transport wheels, in the transport position.

FIG. 9 shows a closeup of the rear end of the device in transport position. More clearly shown are the structured members 10*b* and 10*c* which are firmly attached to the platform and conveyor casings 10 and 10*a* respectively. Hydraulics 17 are pivotally attached at 24*a* and 24*b*.

It should be understood that conveyor casings 10, 10*a* and structural members 10*b*, 10*c* and 32 do not move relative to the platform 2. Only the main elevating conveyor 7, by means of articulated joints 33, is able to change its angle relative to the platform through the intermediary stub section 27.

Once the device is placed in the unloading position with the hitch raised and the hydraulics at the rear extended, power takeoff shaft 18*a* is activated and the shafts are placed in a rotating operating position. A particulate material transport truck is then driven over discharge opening 19 and the grain, via the conveyors, is elevated up into a bin or other area.

Thereafter, the process is reversed, the hydraulics retracted, the hitch and transport wheels lowered, and the operator can move the device to another position such that the main auger is positioned over another grain bin. The operator need never leave the cab of the power towing source, during active unloading and placement of the device to another location.

The foregoing is illustrative only of the principles of the invention. Further, since numerous changes and modifications will occur to those skilled in the art, it is not desired to limit the invention to the exact construction and operation shown and described, and accordingly, all such suitable changes and modifications in structure or operation which may be resorted to are intended to fall within the scope of the claimed invention.

The invention claimed is:

1. An integrated mobile unloading and conveying device for particulate material adapted to be towed and activated by a power source, said device including: an elongated horizontally disposed platform; said platform being supported at one end by a pair of retractable transport wheels, and at an opposite end by a hingedly connected hitch; said hitch adapted to be mounted to said power source; a rearward and a forward pair of foldable ramps; said ramps being transverse to said platform, parallel to one another, and extending outwards from both sides of said platform; at least one first horizontally disposed transfer conveyor located within said platform, and adapted in operation to move particulate material rearwardly within said platform; said at least one transfer conveyor being connected by articulated joints to at least one obliquely disposed second transfer conveyor; said at least one second transfer conveyor being connected at a remote end to a main elevating conveyor by a pivotal joint; said second transfer conveyor in operation adapted to discharge particulate material into said main conveyor; and said platform further including on its upper side a particulate material receiving aperture adapted to receive contents of a vehicle transporting particulate material; said aperture being located between said forward pair and said rearward pair of ramps; wherein in operation, when said hitch is raised at its forward end and said transport wheels are retracted, said platform is in an operating unloading position adapted to receive and convey particulate material; and when said transport wheels are extended and said hitch is lowered at its forward end, said device can be transported to another location such that a remote end of said main conveyor can be positioned to discharge its contents into a desired storage facility.

2. A device as claimed in claim 1 wherein said ramps are foldable for transport.

3. A device as claimed in claim 1 wherein said transport wheels, said conveyors, said ramps, and said hitch are activated from the power/towing source.

4. A device as claimed in claim 1 wherein said hitch and said transport wheels are connected by a mechanical link, adjusted by turnbuckles, such that when said wheels are retracted, said hitch is raised, and when said wheels are extended, said hitch is lowered.

5. A device as claimed in claim 1 wherein said at least one secondary particulate conveyance device includes two first transfer conveyors and two second transfer conveyors.

6. A particulate material unloading apparatus adapted for attachment to an agricultural tractor for movement in an operating travel direction and for driving the apparatus, the apparatus comprising:
   a main conveyor substantially aligned with the operating travel direction, and supported on main wheels for movement in the operating travel direction;
   an elongated horizontally disposed platform substantially aligned with the main conveyor and pivotally attached to a front end of the main conveyor about a substantially horizontal axis transverse to the operating travel direction such that the platform and main conveyor are maintained in substantial alignment;
   said platform further including on its upper side a particulate material receiving aperture;
   at least one retractable transport wheel supporting a rear end of the platform and a front end of the main conveyor;
   a hitch adapted at a front end thereof for attachment to the tractor, and pivotally attached at a rear end thereof to a front end of the platform about a substantially horizontal axis oriented transverse to the operating travel direction;
   a rearward and a forward pair of foldable ramps, said ramps being transverse to said platform, parallel to one another, and extending outwards from both sides of said platform;
   transfer means for conveying particulate material from the platform to the main conveyor;
   a driveline adapted at a front end thereof for connection to a power takeoff of the agricultural tractor, and extending through the platform to drive the transfer means and main conveyor;
   where in operation the main conveyor is maneuvered into a location as desired to discharge particulate material, a front end of the hitch is moved up and the at least one retractable transport wheel is moved up to lower the platform to rest on the ground, and the foldable ramps are extended and lowered to enable passage over the ramps of a vehicle transporting particulate material.

7. The apparatus of claim 6 wherein the platform is further pivotally attached to the front end of the main conveyor about an axis substantially aligned with a main casing of the main conveyor.

8. The apparatus of claim 7 wherein a lower end of the main conveyor comprises a stub casing rotatable with respect to the main casing about the axis substantially aligned with the main casing.

9. The apparatus of claim 6 wherein the transfer means comprises right and left transfer screw conveyors oriented in alignment with the operating travel direction.

10. The apparatus of claim 9 wherein the transfer means further comprises right and left extension screw conveyors extending rearward and upward from corresponding right and left transfer screw conveyors.

11. The apparatus of claim 10 wherein the right and left extension screw conveyors each comprise an extension conveyor casing fixed at a lower front thereof to a rear end of the platform, and pivotally attached at upper rear ends thereof to corresponding right and left sides of a lower end of the main conveyor about a single pivot axis oriented substantially horizontally and transverse to the operating travel direction such that particulate material is transferred from the platform into the right and left sides of a lower end of the main conveyor.

12. The apparatus of claim 11 wherein the lower end of the main conveyor comprises a stub casing rotatable with respect to a main casing of the main conveyor about an axis substantially aligned with the main casing.

13. The apparatus of claim 9 wherein the driveline comprises a main drive shaft oriented in alignment with and between the right and left transfer screw conveyors.

14. The apparatus of claim 12 wherein the main conveyor comprises a main screw mounted inside a main casing, and wherein the main drive shaft is connected by a joint to a lower end of the main screw.

15. The apparatus of claim 6 wherein said hitch and said at least one transport wheel are connected by a mechanical link such that when said at least one retractable wheel is moved up the front end of the hitch is moved up.

* * * * *